United States Patent [19]

Lewis, Jr.

[11] Patent Number: 5,255,592
[45] Date of Patent: Oct. 26, 1993

[54] WRIST PIN AND METHOD FOR MANUFACTURING A WRIST PIN

[75] Inventor: Arthur J. Lewis, Jr., Grosse Ile, Mich.

[73] Assignee: W. A. Thomas Co., Chelsea, Mich.

[21] Appl. No.: 831,691

[22] Filed: Feb. 5, 1992

[51] Int. Cl.$^5$ .............................................. F16J 1/04
[52] U.S. Cl. ...................................... 92/223; 92/222; 92/208; 74/579 R; 74/579 E; 29/888.05; 384/625
[58] Field of Search .................... 92/208, 222, 223; 74/579 R, 579 E; 29/888.05, 888.09; 384/625

[56] References Cited

U.S. PATENT DOCUMENTS

| | | | |
|---|---|---|---|
| 1,670,564 | 5/1928 | Breer | 29/888.05 |
| 2,770,551 | 11/1956 | Powell | 309/19 |
| 2,806,752 | 9/1957 | Ginn | 29/888.05 X |
| 3,575,089 | 4/1971 | Smith | 92/187 |
| 3,703,094 | 11/1972 | Cree, Jr. | 92/222 X |
| 3,842,938 | 10/1974 | Barnes-Moss | 74/579 E X |
| 4,044,589 | 8/1977 | Waimsley | 72/341 |
| 4,300,274 | 11/1981 | Papst | 29/156.5 |
| 4,430,906 | 2/1984 | Holtzberg et al. | 74/595 |
| 4,594,988 | 6/1986 | Tompkins, Jr. et al. | 123/502 |
| 4,958,511 | 9/1990 | Marcus | 73/7 |
| 5,076,149 | 12/1991 | Everts | 92/208 |

FOREIGN PATENT DOCUMENTS

| | | | |
|---|---|---|---|
| 651787 | 2/1929 | France | |
| 1-077769 | 3/1989 | Japan | 92/222 |

Primary Examiner—Thomas E. Denion
Attorney, Agent, or Firm—Robert C. Tucker; William David Kiesel

[57] ABSTRACT

A wrist pin is provided for connecting a connecting rod to a piston, comprising a cylindrical aluminum pin having an outer cylindrical surface, the pin being matingly insertable into a bore of a piston, the outer cylindrical surface having an anodized coating applied thereto. A process for manufacturing a wrist pin is also provided, comprising the steps of machining a cylindrical pin, having an outer cylindrical surface, from aluminum stock; and applying an anodized coating to the outer cylindrical surface. The preferred anodized coating comprises a hardcoat anodized coating.

4 Claims, 1 Drawing Sheet

WRIST PIN AND METHOD FOR MANUFACTURING A WRIST PIN

BACKGROUND OF THE INVENTION

1. Field of the Invention.

This invention relates generally to wrist pins used to connect a piston to a connecting rod, and, more specifically, to aluminum wrist pins.

2. Prior Art.

In a great number of applications, the vast majority of reciprocating piston assembly parts are constructed of aluminum. This is true in internal combustion engines, pumps, reciprocating compressors and other applications. Aluminum provides a lighter, and more efficient, alternative to steel or cast iron. However, it has been universally accepted for many years that the wrist pin, which connects the piston and connecting rod, must at least have an outer cylindrical surface constructed of steel. Thus, wrist pins have historically been constructed of steel or compositions of steel and aluminum, or steel and plastic, always having an outer cylindrical surface of steel.

A serious problem results when a steel wrist pin is placed in a bore of an aluminum piston. The coefficient of expansion for aluminum greatly differs from that of steel. Therefore, as the piston assembly heats during use, the bore of the piston enlarges at a rate greater than that of the steel surface of the wrist pin, causing the pin to become loose in the bore. Over time, damage to the piston, pin and/or the cylinder wall results from this loose condition. While, ideally, it would be beneficial to manufacture the pin and piston of the same material, it has been accepted that this is not possible, given the softness and lack of bearing capacity of aluminum. In an attempt to reduce the weight of steel wrist pins, tubular steel wrist pins have been employed. Tubular steel wrist pins are manufactured by boring a solid steel wrist pin. During the manufacturing process, some burrs and other contaminants will travel within the bore of the tubular steel pin, and ultimately end up in the assembled machinery, possibly causing long term damage of the machinery. The bores of tubular steel pins have been filled with aluminum or polymeric material, but such practices dramatically increase the cost of manufacture. Additionally, in order to minimize the damage caused by steel pins, steel pins are manufactured to very tight tolerances, also increasing the cost of manufacture.

SUMMARY OF THE INVENTION

Therefore, it is an object of this invention to provide an aluminum wrist pin which will have a hard outer surface, but will expand and contract at substantially the same rate as the piston bore in which the pin is installed.

Accordingly, a wrist pin is provided for connecting a connecting rod to a piston, comprising a cylindrical aluminum pin having an outer cylindrical surface, the pin being matingly insertable into a bore of a piston, the outer cylindrical surface having an anodized coating applied thereto. A process for manufacturing a wrist pin is also provided, comprising the steps of machining a cylindrical pin, having an outer cylindrical surface, from aluminum stock; and applying an anodized coating to the outer cylindrical surface. The preferred anodized coating comprises a hardcoat anodized coating.

DETAILED DESCRIPTION OF PREFERRED EMBODIMENTS OF THE INVENTION

Figure 1:
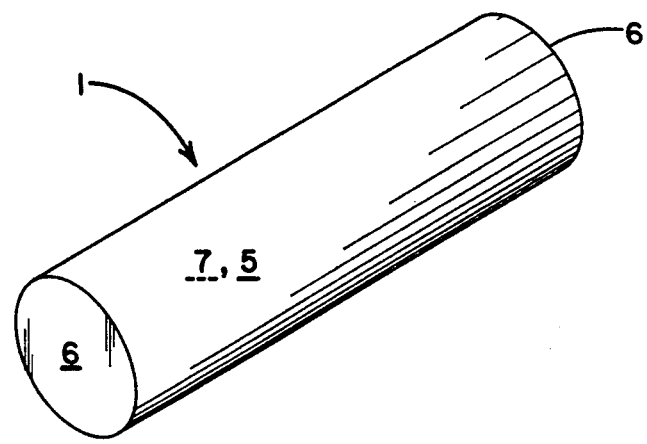
FIG. 1 is a perspective view of an embodiment of the invention.
Figure 2:
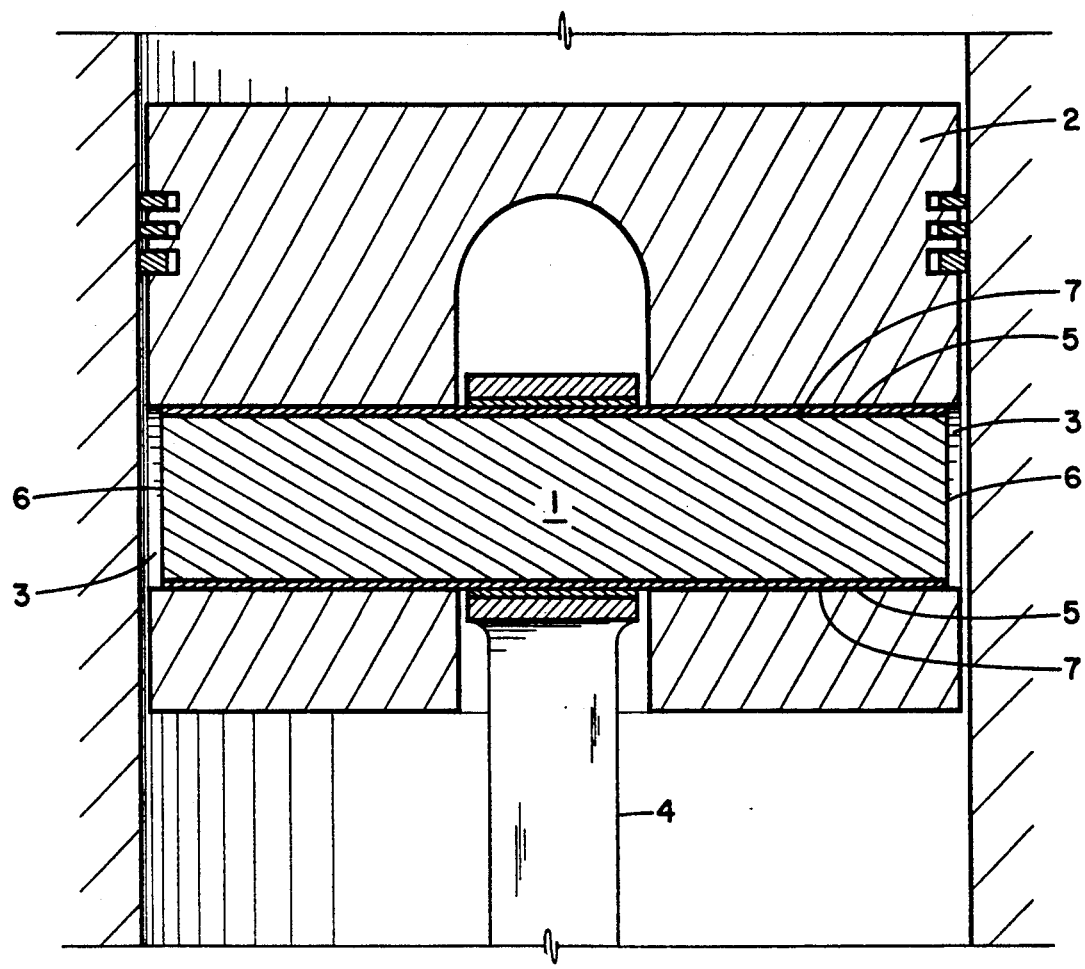
FIG. 2 is a sectional view of an embodiment of the invention installed in a piston.

As shown in the Figures, the wrist pin 1 of the invention is preferably a solid cylindrical pin 1 constructed of aluminum. The term "aluminum" as used herein includes all aluminum alloys. Since the coefficient of expansion of the aluminum pin and the aluminum piston 2 are substantially the same, the diameter of the pin 1 can be the same as the diameter of the bore 3 of the piston 2. Connecting rod 4 connects around pin 1 as shown.

In order to create a hardened wearing surface on the aluminum pin 1, an anodized coating 5 is applied to the outer cylindrical surface 7 of pin 1. It is not necessary to apply coating 5 to the ends 6 of pin 1, since ends 6 have no wearing surfaces. Coating 5 is preferably a "hardcoat" anodized coating, as produced by International Hardcoat, Inc. A hardcoat anodized coating, or type III anodized coating, is formed by immersing the pin 1 in an aqueous solution of $H_2SO_4$. Current is then applied, with the pin 1 being the anode. The operating parameters for a generic hardcoat anodizing process are as follows:

Electrolyte concentration: 22% to 24% $H_2SO_4$
Temperature: $0 \pm 1°$ C. ($32 \pm 2°$ F.)
Time in Bath: 20 to 120 min.
Voltage: constantly increased to maintain current density at 2.5 to 4.0 $A/dm^2$ (23.2 to 37 $A/ft^2$)

Hardcoat produces an exceptionally hard coating 5 and penetrates the base metal for one-half of its thickness and builds above the original base metal dimension for one-half of its thickness. Thus, appropriate sizing of the pin 1 prior to the application of the anodized coating 5 is necessary. In some applications, the hardcoat coating 5 may be applied to achieve a diameter slightly greater than the diameter of the bore 3, and then ground down to the diameter of bore 3 for a smooth finish.

Thus, an aluminum wrist pin 1 is initially machined from stock, and then the anodized coating 5 is applied. The anodized wrist pin 1 will expand and contract at substantially the same rate as the piston 2, since the thin, hardened coating 5 is bonded to the aluminum base metal. The aluminum wrist pin 1 is lightweight, and it is unnecessary to bore the center for weight reduction, eliminating the contamination problems associated with hollow or bored pins. Further, the aluminum wrist pin 1 can be made to less exacting tolerances, since the pin to bore fit is easier to obtain. Other embodiments of the invention will occur to those skilled in the art, and are intended to be included within the scope and spirit of the following claims.

I claim:

1. A wrist pin for connecting a connecting rod to a piston, comprising a cylindrical aluminum pin having an outer cylindrical surface, said pin being matingly inserted into a bore of the piston, said outer cylindrical surface having an anodized coating applied thereto 2. A wrist pin according to claim 1, wherein said anodized coating comprises a hardcoat anodized coating.

3. A process for manufacturing a wrist pin, comprising the steps of:
    a. machining a cylindrical pin, having an outer cylindrical surface, from aluminum stock; and
    b. applying an anodized coating to said outer cylindrical surface.

4. The process for manufacturing a wrist pin according to claim 3, wherein said anodized coating comprises a hardcoat anodized coating.

* * * * *